US005939035A

United States Patent [19]

Besida et al.

[11] Patent Number: 5,939,035

[45] Date of Patent: Aug. 17, 1999

[54] PROCESS FOR TREATING SPENT POTLINING CONTAINING INORGANIC MATTER

[75] Inventors: John Besida, Yarraville; Teresa Kit-Hing Pong, Coburg; Robert Jacques Adrien, St. Kilda; Geoffrey Harold Covey, Heidelberg Heights; Thomas Aloysius O'Donnell, Burwood; David George Wood, St. Kilda, all of Australia

[73] Assignee: The University of Melbourne, Victoria, Australia

[21] Appl. No.: 08/817,579

[22] PCT Filed: Oct. 12, 1995

[86] PCT No.: PCT/AU95/00671

§ 371 Date: Jun. 4, 1997

§ 102(e) Date: Jun. 4, 1997

[87] PCT Pub. No.: WO96/11756

PCT Pub. Date: Apr. 25, 1996

[30] Foreign Application Priority Data

Oct. 13, 1994 [SU] U.S.S.R. ................................ PM 8773

[51] Int. Cl.[6] ................................ C01F 1/00; C01F 7/00; C22B 21/00; C22B 1/00

[52] U.S. Cl. .......................... 423/131; 423/132; 423/163; 588/246

[58] Field of Search .................................... 423/132, 111, 423/131, 114, 490, 101, 163; 588/246

[56] References Cited

U.S. PATENT DOCUMENTS

| | | | |
|---|---|---|---|
| 2,411,806 | 11/1946 | Riesmeyer et al. | 423/132 |
| 3,486,845 | 12/1969 | Vancil et al. | 423/132 |
| 5,352,419 | 10/1994 | Jenkins | 423/132 |
| 5,470,559 | 11/1995 | Grolman et al. | 423/490 |
| 5,558,847 | 9/1996 | Kaaber et al. | 423/132 |

FOREIGN PATENT DOCUMENTS

| | | | |
|---|---|---|---|
| 206765 | 12/1939 | Switzerland | 423/132 |

*Primary Examiner*—Steven Bos

*Attorney, Agent, or Firm*—Sughrue, Mion, Zinn, Macpeak & Seas, PLLC

[57] ABSTRACT

The present invention relates to a process for reducing and/or removing inorganic matter from a material containing inorganic matter which comprises the steps of:

(i) (a) treating the material with a source of hydrogen fluoride so as to form a first residue and a first solution containing inorganic matter;

(b) separating the first residue from the first solution containing the inorganic matter;

(c) treating the first residue with an acid so as to form a second residue and a second solution containing further inorganic matter; and (d) separating the second residue from the second solution containing the further inorganic matter; or (ii) (a) treating the material with an acid so as to form a first residue and a first solution containing inorganic matter;

(b) separating the first residue from the first solution containing the inorganic matter;

(c) treating the first residue with a source of hydrogen fluoride so as to form a second residue and a second solution containing further inorganic matter; and (d) separating the second residue from the second solution containing the further inorganic matter.

27 Claims, 5 Drawing Sheets

PROCESS FOR TREATING SPENT POTLINING CONTAINING INORGANIC MATTER

The present invention generally relates to a process for treating a material containing inorganic matter. More specifically, the present invention relates to a process for reducing and/or removing inorganic matter from spent potlining which is obtained from electrolytic reduction cells used in aluminium smelting.

Aluminium is manufactured using a high temperature process in which alumina is electrolytically reduced in a molten bath of cryolite. This process is conducted in cells, often called pots, and a typical aluminium smelter contains hundreds of pots connected in series. The metallic outer structure of the pot contains an interior bottom lining of refractory brick and a further inner lining of carbon which also extends to cover the side walls. The carbon lining serves as the cathode and also protects the metallic structure of the pot from contact and corrosion by the molten bath of cryolite.

The severe operating conditions experienced within the pot lead to a progressive deterioration of the carbon lining to the extent where either leakage of the inner contents occurs or the aluminium product contains an unacceptably high level of impurities e.g. iron. At this stage, the pot is decommissioned and the lining completely replaced. The lining which includes carbon, a mixture of inorganic fluorides and inorganic oxides and refractory brick is known as spent potlining (hereinafter referred to as "SPL").

SPL usually contains 20 to 40% by weight of carbon and significant quantities of cryolite and other aluminium containing compounds in the form of carbides, nitrides, fluorides and oxides. Sodium fluoride, sodium carbonate and calcium fluoride are also present. Therefore, SPL is no longer considered to be a carbon based residue containing inorganic impurities, but rather a complex matrix of inorganic compounds containing large quantities of fluorides and having carbon as one component.

As SPL contains environmentally harmful and biologically toxic constituents, major restrictions are imposed on its transportation, treatment, storage, handling and disposal. SPL cannot be disposed of in a conventional manner without prior processing to remove the harmful and toxic constituents. The basis for such strict environmental controls is as follows:

(i) SPL contains free and complex cyanides, fluorides and arsenic;

(ii) upon exposure to rainwater, free and complex cyanides, fluorides and arsenic will be leached and enter the environment;

(iii) the interaction of sunlight and free and complex cyanides, fluorides and arsenic may result in the release of hydrogen cyanide;

(iv) free and complex cyanides, fluorides and arsenic are toxic;

(v) improper disposal of SPL can result in a substantial hazard to the environment as demonstrated by the migration, mobility and persistence of free and complex cyanides, fluorides and arsenic; and (vi) SPL is generated in large quantities of approximately 400,000 tonnes per year throughout the world.

In view of these major environmental restrictions, numerous processes for treating SPL have been investigated and the majority of these have included either high temperature treatment, wet processes or combinations thereof.

High temperature treatment of SPL destroys cyanide by oxidation, but fluoride emission to the atmosphere is considerable. Furthermore this treatment, which usually produces refractory slags and ash, does not allow the more valuable components of SPL, such as, aluminium compounds to be recovered for use in the aluminium industry because these compounds are made chemically refractory as a result of the use of high temperatures in the presence of air.

Most of the wet processes have involved leaching by either water, sulphuric acid or caustic solutions in an attempt to extract the inorganic values from the carbonaceous matrix. However, these processes have proved to be inadequate in that they have either failed to completely remove the hazardous constituents or have generated products which are not readily disposable, recyclable or marketable. For example, caustic processes extract aluminium from SPL as a water-soluble aluminate and then convert this to cryolite. The demand for cryolite is minimal as this solid is formed in excess as an unwanted by-product of the aluminium smelting process.

A requirement accordingly exists for an improved process for reducing and/or removing inorganic matter from materials containing inorganic matter, such as SPL, so that these materials can be safely disposed of with minimal environmental concern. There is also a need to be able to convert the inorganic matter to value added products, for example, aluminium fluoride in the case of SPL.

According to the present invention there is provided a process for reducing and/or removing inorganic matter from a material containing inorganic matter which comprises the steps of:

(i) (a) treating the material with a source of hydrogen fluoride so as to form a first residue and a first solution containing inorganic matter;

(b) separating the first residue from the first solution containing the inorganic matter;

(c) treating the first residue with an acid so as to form a second residue and a second solution containing further inorganic matter; and (d) separating the second residue from the second solution containing the further inorganic matter; or (ii) (a) treating the material with an acid so as to form a first residue and a first solution containing inorganic matter;

(b) separating the first residue from the first solution containing the inorganic matter;

(c) treating the first residue with a source of hydrogen fluoride so as to form a second residue and a second solution containing further inorganic matter; and (d) separating the second residue from the second solution containing the further inorganic matter.

Preferably process (i) is employed in which the acid treatment step is performed after step (b).

The source of hydrogen fluoride may be anhydrous or aqueous hydrogen fluoride (HF), fluorosilicic acid ($H_2SiF_6$), ammonium bifluoride ($NH_4HF_2$), hydrogen fluoride formed in situ or mixtures thereof. The hydrogen fluoride may be formed in situ by the combination of an inorganic fluoride and an acid. Suitable inorganic fluorides may include alkali metal fluorides, for example, sodium fluoride or potassium fluoride; alkaline earth metal fluorides, for example, calcium fluoride, magnesium fluoride or barium fluoride; or a complex fluoride, for example, cryolite, chiolite or a fluorosilicate salt, such as, $Na_2SiF_6$, $K_2SiF_6$ or $CaSiF_6$. Preferably, the acid combined with the fluoride is a strong acid, for example, concentrated sulphuric acid ($H_2SO_4$).

The acid used to treat the residue in step (c) of process (i) or the material in step (a) of process (ii) is preferably a strong acid, for example, fluorosilicic ($H_2SiF_6$) or concentrated sulphuric acid ($H_2SO_4$).

The residues obtained from steps (b) and (d) can be separated from the solution containing the unwanted constituents by any suitable known technique, such as, for example, decantation, filtration and centrifugation.

In the process of the invention, any of the steps may be preceded or followed by a water washing step.

The final residue formed after step (d) may contain wanted and/or unwanted products. The wanted and unwanted products may be separated using any suitable known technique. The wanted product may also be subjected to further processing if desired.

The unwanted product may be disposed of in a conventional manner, for example, by land fill as it no longer contains harmful inorganic matter and therefore does not pose any environmental or human health hazards.

The material containing inorganic matter may be a carbonaceous material containing inorganic matter, such as, for example, coal, coke, graphite and other carbon structures or any residue from a chemical process, such as, for example, spent electrode waste, cryolite, refractory bricks and SPL. The process of the invention is particularly useful in treating SPL obtained from the electrolytic reduction cells used in aluminium smelting. A typical composition of SPL is shown in Table 1 below.

TABLE 1

| Composition of SPL | | |
|---|---|---|
| COMPOUNDS | TYPICAL (%) | RANGE (%) |
| NaF | 14 | 8–16 |
| $Na_3AlF_6$ | 11 | 7–14 |
| C | 26 | 20–40 |
| $SiO_2$ | 5 | 1–7 |
| $CaF_2$ | 5 | 3–7 |
| $Al(OH)_3$ | 6 | 5–10 |
| $Al_2O_3$ | 4 | 2–7 |
| $CaCO_3$ | 1 | 0–3 |
| $NaAl_{11}O_{17}$ | 8 | 5–10 |
| $NaAlSiO_4$ | 5 | 3–7 |
| Al metal | 1 | 0.5–3 |
| $Na_4Fe(CN)_6$ | 0.1 | 0.05–0.4 |
| KF | 0.005 | 0.001–0.1 |
| $Fe_2O_3$ | 2.5 | 1.5–3.5 |
| MgO | 0.5 | 0.2–1.0 |
| $TiO_2$ | 0.3 | 0.1–0.7 |
| $Na_2SO_4$ | 1.0 | 0.5–4.5 |
| $Na_2CO_3$ | 6.5 | 5–10 |
| $Al_4C_3$ | 1 | 0.5–3 |
| AlN | 1 | 0.5–1.5 |
| Na metal | <0.1 | 0.005–0.1 |
| $H_2O$ | 4 | 3–6 |
| As | 0.0005 | 0.0001–0.001 |

A preferred embodiment of the invention will now be described encompassing process (i) steps (a) to (d) by way of example only in which the material containing inorganic matter being treated is SPL.

The SPL may be first treated magnetically to remove iron and/or iron oxides which may be present. This advantageously results in reduced iron contamination of the products recovered from the subsequent steps.

The material may also be washed with water before step (a). Preferably, the water is used at a temperature close to ambient and a volume about seven times the weight of SPL being treated. This water washing step dissolves the water soluble sodium salts, such as, sodium fluoride and sodium carbonate without dissolving a significant amount of cryolite. Extraction of these sodium salts prior to step (a) results in the formation of less sodium hexafluorosilicate in the subsequent steps which means that less of the source of HF will need to be used which is economically attractive. A large amount of the free and complexed cyanide contained in the SPL is also extracted into this aqueous solution.

The solution resulting after the initial water wash step contains dissolved materials, such as fluoride, in a form suitable for conversion into useful products, such as, for example, calcium fluoride.

The carbonaceous residue recovered after the water wash is treated in step (a) with aqueous HF which may be used at any convenient concentration. Based on the composition of SPL given in Table 1, the chemically reactive compounds in the SPL will react with aqueous HF as shown in the following equations:

| | |
|---|---|
| (1) | $SiO_2 + 6HF \rightarrow H_2SiF_6 + 2H_2O$ |
| (2) | $Al(OH)_3 + 3HF \rightarrow AlF_3 + 3H_2O$ |
| (3) | $NaAlSiO_4 + 10HF \rightarrow H_2SiF_6 + AlF_3 + NaF + 4H_2O$ |
| (4) | $2Al + 6HF \rightarrow 2AlF_3 + 3H_2$ |
| (5) | $Fe_2O_3 + 6HF \rightarrow 2FeF_3 + 3H_2O$ |
| (6) | $MgO + 2HF \rightarrow MgF_2 + H_2O$ |
| (7) | $TiO_2 + 6H \rightarrow H_2TiF_6 + 2H_2O$ |
| (8) | $Al_4C_3 + 12H_2O \rightarrow 4Al(OH)_3 + 3CH_4$ |
| | $4Al(OH)_3 + 12HF \rightarrow 4AlF_3 + 12H_2O$ |
| Overall: | $Al_4C_3 + 12\ HF \rightarrow 4AlF_3 + 3CH_4$ |
| (9) | $AlN + 3H_2O \rightarrow Al(OH)_3 + NH_3$ |
| | $Al(OH)_3 + 3HF \rightarrow AlF_3 + 3H_2O$ |
| Overall | $AlN + 3HF \rightarrow AlF_3 + NH_3$ |

The aqueous HF wash fluoridates the oxides in SPL, apart from corundum (alpha alumina) and sodium beta-aluminate ($NaAl_{11}O_{17}$) and dissolves fluorides apart from those compounds which have a low solubility in aqueous HF, such as, for example, cryolite, calcium fluoride and magnesium fluoride. It has been found that by treating the SPL with dilute HF having a concentration within a narrow range, a substantial amount of cryolite, calcium fluoride and magnesium fluoride can also be extracted into the solution.

It is preferred that the concentration of aqueous HF in step (a) is just below the amount required to adequately fluoridate all of the reactive aluminium species in the SPL according to equations (1) to (9) above so as to produce fluoride complexed cations of aluminium. This concentration of HF lies within a narrow range and is dependant upon the reactive aluminium content of the SPL sample. It is believed that when this concentration of HF is used, fluoride complexed cations of aluminium are initially formed. These cations are able to accept fluoride from insoluble cryolite, calcium fluoride and magnesium fluoride in the SPL to produce the water soluble ions $AlF_5^{2-}$, $CaF^+$ and $MgF^+$ resulting in a much higher level of extraction of the inorganic material from the SPL. The reactions leading to the dissolution of cryolite and calcium fluoride by fluoride complexed aluminium cations can be represented by the following equations:

| | | | | | |
|---|---|---|---|---|---|
| (10) | $(AlF_{3-n})^{n+}$ + (aq) | $Na_3AlF_6 \leftrightarrow$ (s) | $(AlF_{4-n})^{(n-1)+}$ + (aq) | $AlF_5^{2-}$ + (aq) | $3Na^+$ (aq) |
| (11) | $(AlF_{3-n})^{n+}$ + (aq) | $CaF_2 \leftrightarrow$ (s) | $(AlF_{4-n})^{(n-1)+}$ + (aq) | $CaF^+$ (aq) | |

For example, the quantity of HF required to fluoridate the reactive compounds in SPL can be calculated from the stoichiometries shown in equations (1) to (9) above and from the typical concentrations of the compounds shown in Table 1 above. Based on the treatment of 160 g of water washed SPL, which is equivalent to 200 g of raw SPL, with 1000 ml of HF solution, this value, which is shown in Table 2 below has been calculated to be 3.0 mole or 6 weight percent of HF.

TABLE 2

| Compounds | Typical % in SPL | For 200 g of Raw SPL (yields 160 g after water wash) Mass (g) | Mole | Mole of HF required for reaction |
|---|---|---|---|---|
| 1. $SiO_2$ | 5 | 10.0 | 0.166 | 0.996 |
| 2. $Al(OH)_3$ | 6 | 12.0 | 0.154 | 0.462 |
| 3. $NaAlSiO_4$ | 5 | 10.0 | 0.0704 | 0.704 |
| 4. Al | 1 | 2.00 | 0.0741 | 0.222 |
| 5. $Fe_2O_3$ | 2.5 | 5.00 | 0.0313 | 0.188 |
| 6. MgO | 0.5 | 1.00 | 0.0248 | 0.050 |
| 7. $TiO_2$ | 0.3 | 0.600 | 0.00751 | 0.045 |
| 8. $Al_4C_3$ | 1 | 2.00 | 0.0139 | 0.167 |
| 9. AlN | 1 | 2.00 | 0.0488 | 0.146 |
| Total amount of HF required | | | | 3.0 mole |

The effect of HF concentration on the extraction of mineral matter and in particular, that of aluminium, calcium and sodium, from the SPL, when 160 g of water washed SPL is treated with 1000 ml of HF solution is represented graphically in the accompanying drawings in which:

Figure 1:
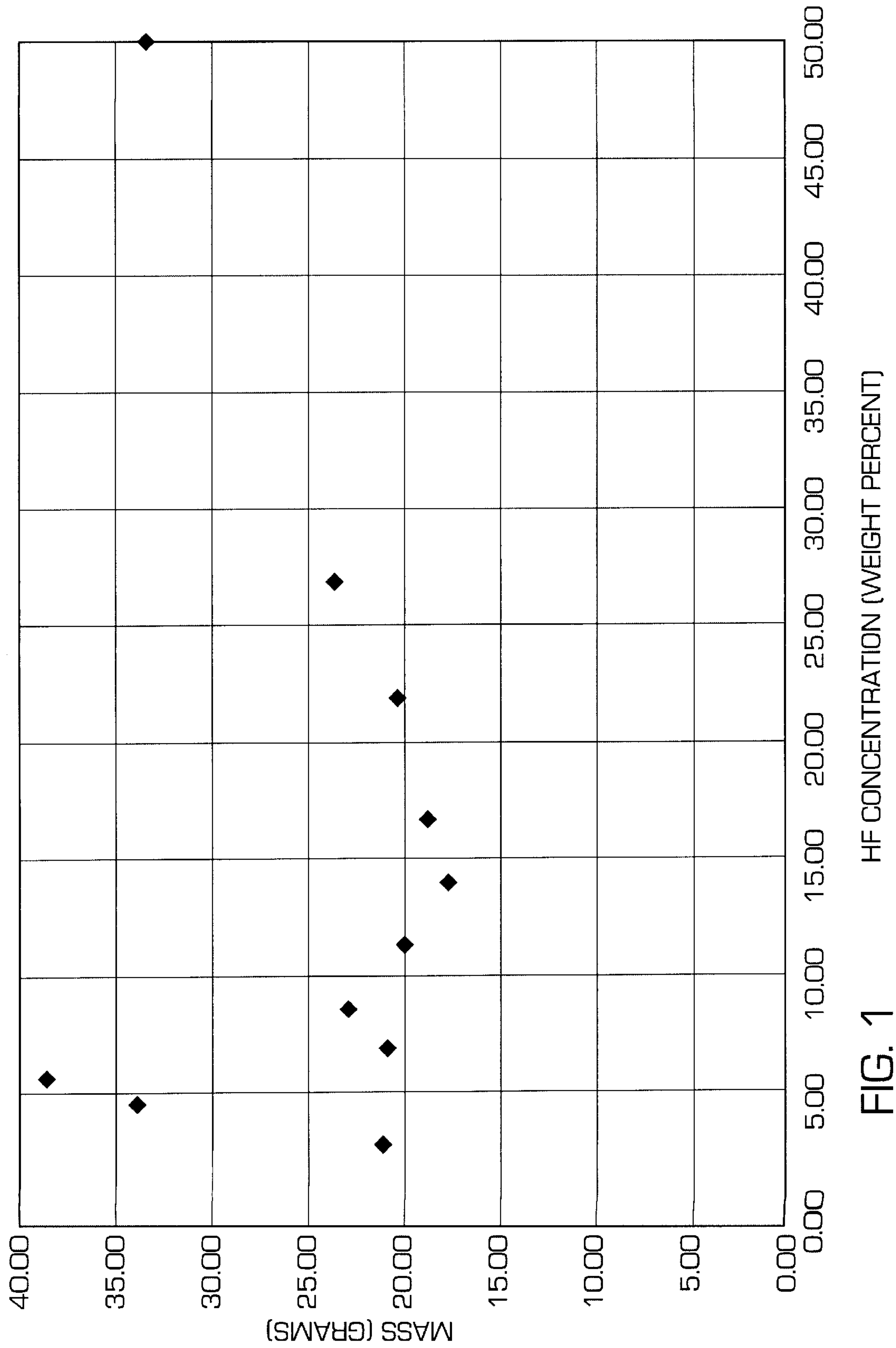
FIG. 1 is a graphical representation showing mass of filtrate residue (grams) versus HF concentration (weight percent)
Figure 2:
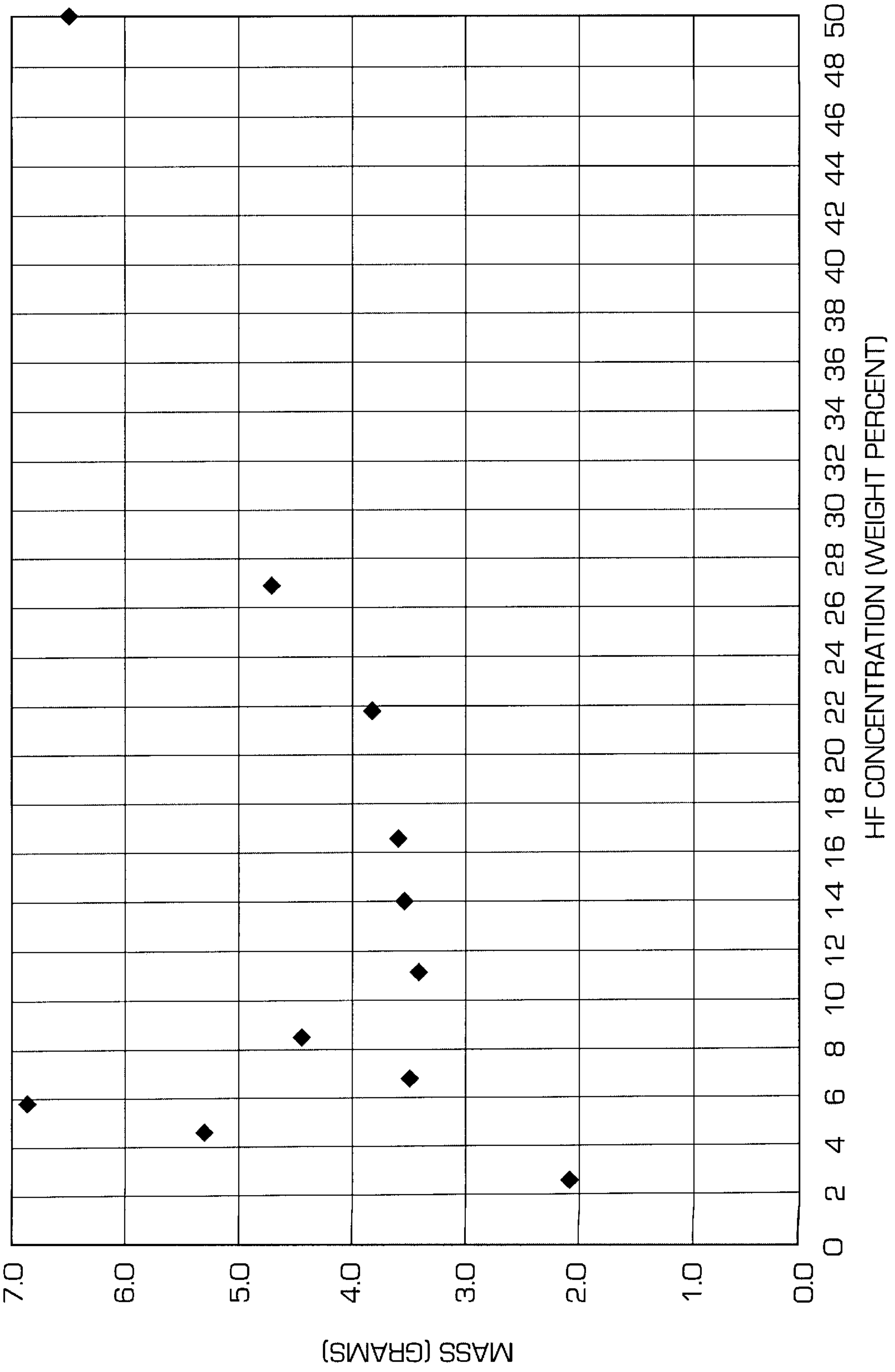
FIG. 2 is a graphical representation showing mass of aluminium in filtrate residue (grams) versus HF concentration (weight percent)
Figure 3:
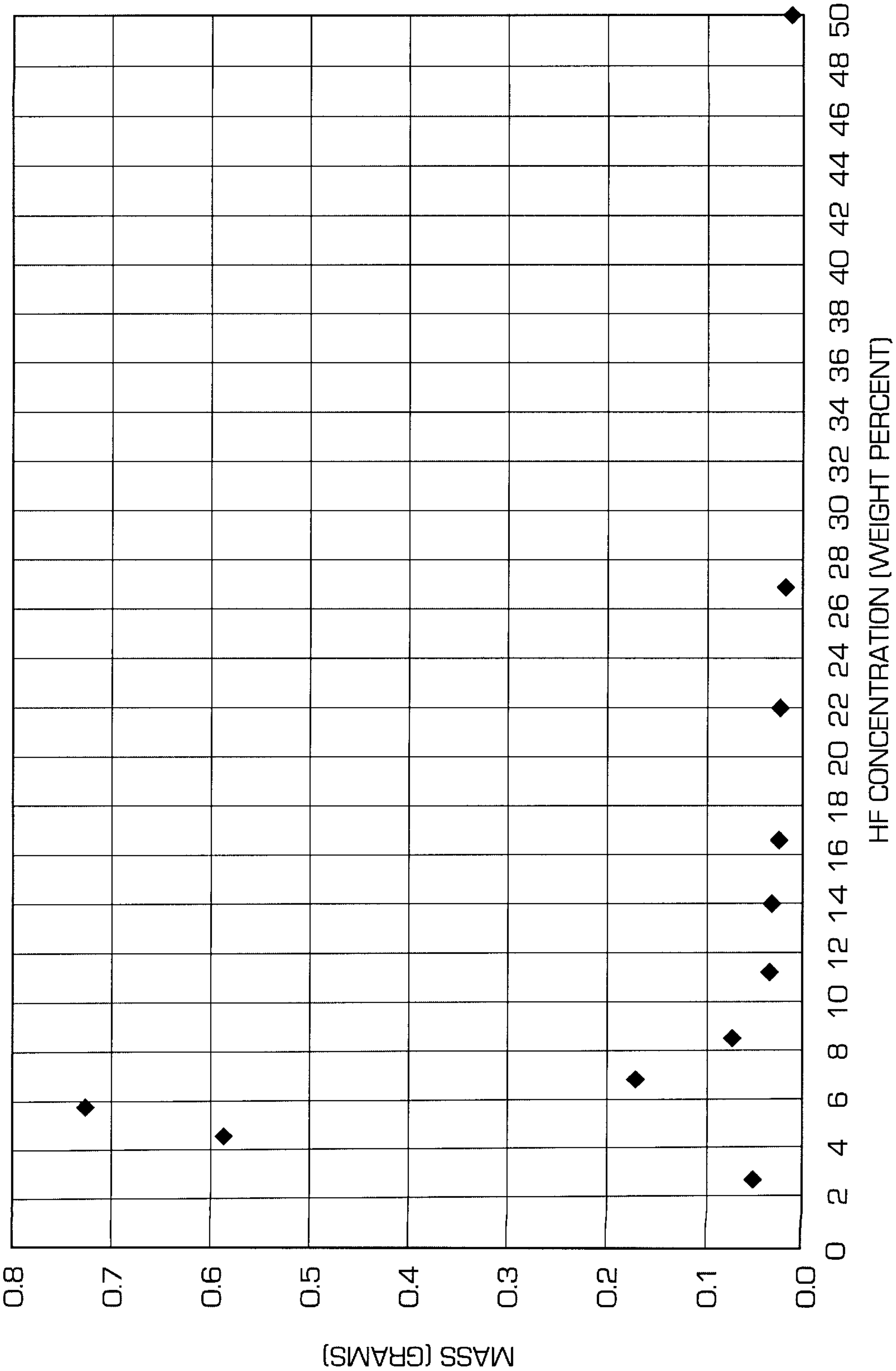
FIG. 3 is a graphical representation showing mass of calcium in filtrate residue (grams) versus HF concentration (weight percent)
Figure 4:
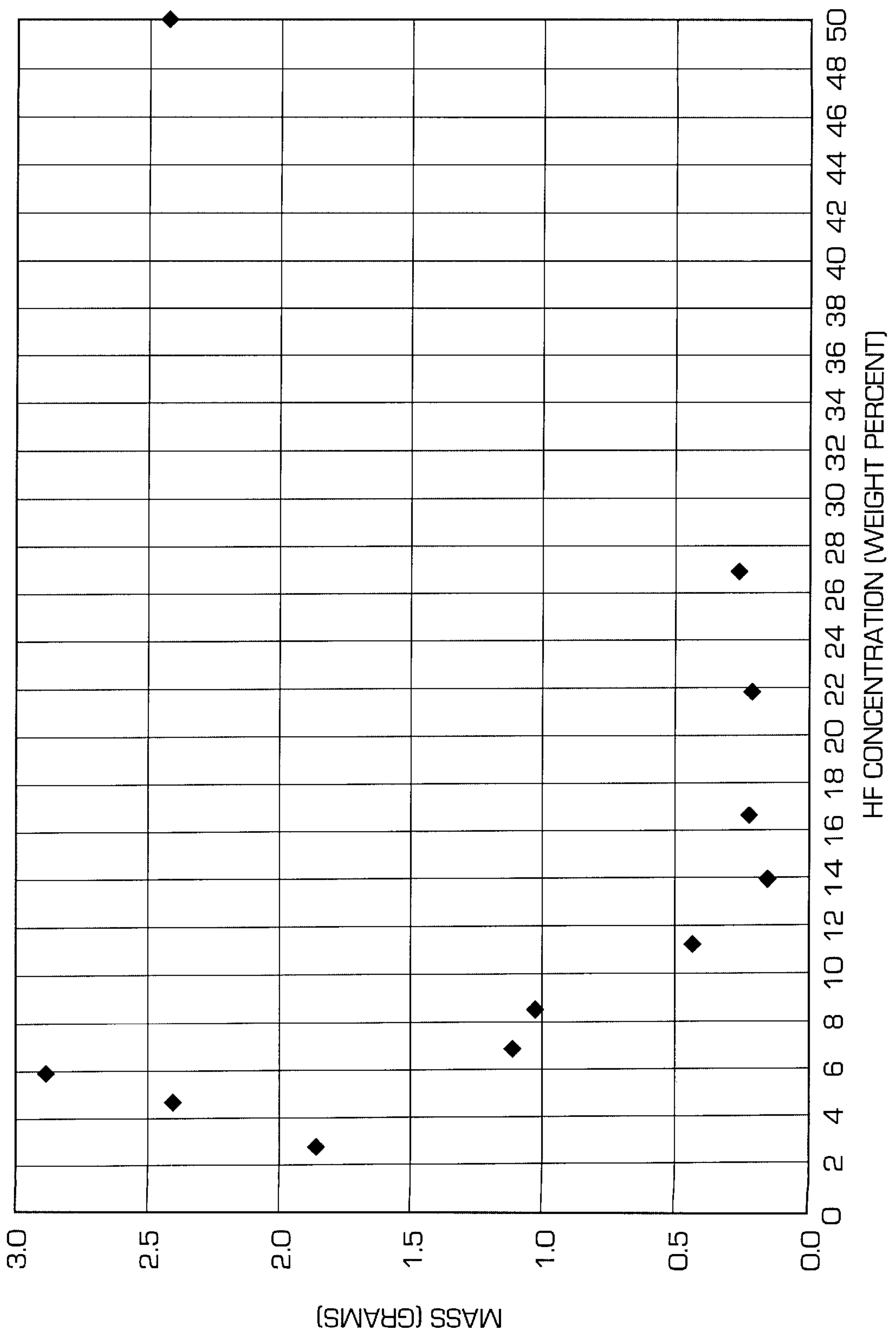
FIG. 4 is a graphical representation showing mass of sodium in filtrate residue (grams) versus HF concentration (weight percent).

The maximum extraction of solid from the SPL occurs when a concentration of HF below 6 weight percent is used. When this concentration is exceeded, the initial formation of the fluoride complexed aluminium anions $AlF_4^-$ and $AlF_5^{2-}$ is favoured, instead of fluoride complexed aluminium cations. Based on stability constants, these species are not capable of dissolving the calcium fluoride and cryolite in the SPL, resulting in an overall lower level of extraction of material from the SPL.

In addition to the HF treatment step, a source of aluminium cations can be added to the reacted mixture of HF and SPL, to further increase the level of extraction of material from the SPL. The source of aluminium cations may be aluminium salts, such as, for example, $Al(NO_3)_3$, $Al_2(SO_4)_3$ or $AlCl_3$ or any aluminium compound which is capable of producing aluminium cations on reaction with HF, such as, aluminium hydrate, for example, $Al(OH)_3$. If an aluminium salt is employed it is particularly preferred to use $Al(NO_3)_3$, as the addition of $Al_2(SO_4)_3$ to the reaction mixture results in the precipitation of the dissolved calcium as $CaSO_4$ which contaminates the carbonaceous residue.

The solution formed after the HF wash step contains an abundance of dissolved aluminium which is in a form amenable to the recovery of smelter grade aluminium fluoride.

The acid used to treat the residue in step (c) is preferably a strong acid, for example, fluorosilicic ($H_2SiF_6$) or concentrated sulphuric acid ($H_2SO_4$).

Aqueous $H_2SiF_6$ is preferably used at a concentration below about 25% w/w and may be obtained from scrubbing the gaseous effluent from phosphate plants. The $H_2SiF_6$ solution extracts most of the remaining water insoluble fluorides of calcium and magnesium as soluble fluorosilicate salts from the SPL. This acid has also been found to show an ability to dissolve cryolite, through the formation of the sparingly soluble sodium hexafluorosilicate salt and water soluble fluoride complexed aluminium ions as shown in the following equation:

$$(12)\quad \underset{(s)}{Na_3AlF_6} + \underset{(aq)}{H_2SiF_6} \rightarrow \underset{(s)}{Na_2SiF_6} + \underset{(aq)}{AlF_n^{(3-n)}} \quad n = 0\text{–}6$$

Arsenic is also selectively extracted into the $H_2SiF_6$ solution as a soluble fluoroarsenate salt.

The solution formed after the fluorosilicic acid wash of SPL contains dissolved aluminium species which can be recovered in a form suitable for conversion to aluminium fluoride.

In an alternative step, the residue from step (b) can be dried and then treated with concentrated $H_2SO_4$ so as to convert fluoride compounds to sulphate compounds and to produce gaseous HF which may be collected by aqueous scrubbing and recycled to step (a). Preferably, the concentrated $H_2SO_4$ is heated before use.

In process (i), any of the steps may be followed by a water washing step of the residue, preferably using heated water. In the case of SPL, heated water dissolves sodium hexafluorosilicate which is formed during the preceding steps in particular, step (c), when the acid used is fluorosilicic acid.

When a water washing step is used after step (d) and the acid used is $H_2SO_4$, then this will remove the sulphate compounds which are water soluble. The resulting aqueous solution, which predominantly contains dissolved sulphates of sodium, calcium, magnesium and aluminium may be used or further processed to isolate the aluminium compounds in a form suitable for conversation into smelter grade aluminium fluoride.

The final residue formed after step (d) containing wanted and/or unwanted products may be heated, for example, at a temperature above 100° C. to remove any remaining volatile unwanted products. This heating step may be performed in an inert atmosphere or under reduced pressure. After drying, the final SPL residue may contain carbon, refractory aluminium compounds, such as, corundum and sodium beta-aluminate or a small amount of calcium fluoride. If desired, these compounds can be separated from the final residue using any suitable known technique, such as, for example, cycloning or flotation. The unwanted product may also be subjected to further processing if desired.

The unwanted product may be disposed of in a conventional manner, for example, by land fill as it no longer contains harmful inorganic matter and therefore does not pose any environmental or human health hazards.

In a particularly preferred embodiment, the present invention provides a process for reducing and/or removing inorganic matter from SPL which comprises the steps of:

(i) (a) treating the SPL with water so as to form a first residue and a first solution containing water-soluble inorganic matter;

(b) separating the first residue from the first solution containing the water-soluble inorganic matter;

(c) treating the first residue with HF so as to form a second residue and a second solution containing inorganic matter;

(d) separating the second residue from the second solution containing the inorganic matter;

(e) treating the second residue with $H_2SiF_6$ or $H_2SO_4$ so as to form a third residue and a third solution containing further inorganic matter;

(f) separating the third residue from the third solution containing further inorganic matter;

(g) washing the third residue with water so as to form a fourth residue and a fourth solution containing still further inorganic matter; and (h) separating the fourth residue from the fourth solution containing still further inorganic matter; or (ii) (a) treating the SPL with water so as to form a first residue and a first solution containing water-soluble inorganic matter;

(b) separating the first residue from the first solution containing the water-soluble inorganic matter;

(c) treating the first residue with $H_2SiF_6$ or $H_2SO_4$ so as to form a second residue and a second solution containing inorganic matter;

(d) separating the second residue from the second solution containing the inorganic matter;

(e) treating the second residue with HF so as to form a third residue and a third solution containing further inorganic matter;

(f) separating the third residue from the third solution containing further inorganic matter;

(g) washing the third residue with water so as to form a fourth residue and a fourth solution containing still further inorganic matter; and (h) separating the fourth residue from the fourth solution containing still further inorganic matter.

Figure 5:
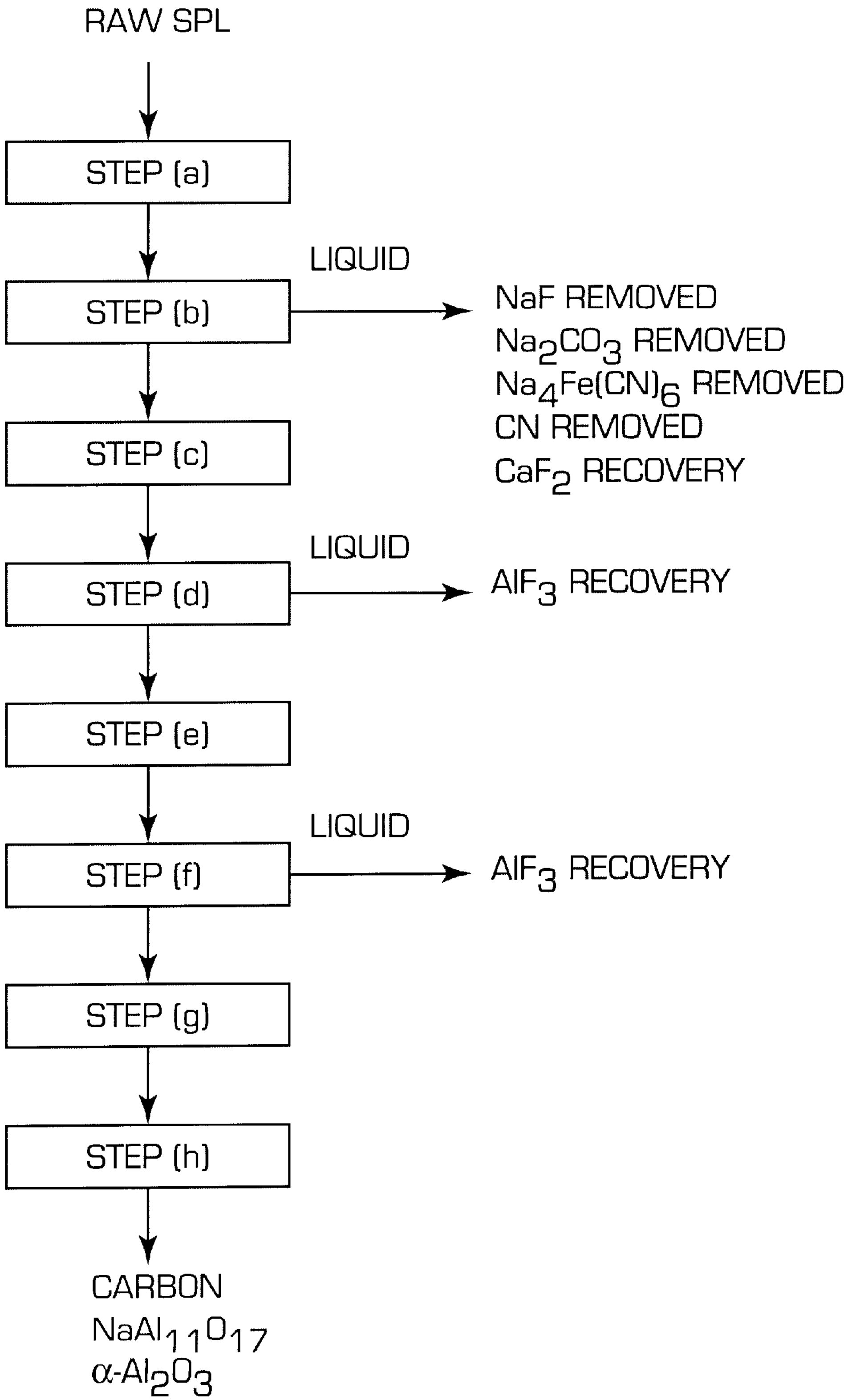
FIG. 5 is a flow chart showing a particular preferred embodiment of the present invention.

This particularly preferred embodiment of the present invention is shown in the form of a flow chart in accompanying FIG. 5.

Preferably, the SPL is subjected to magnetic treatment before step (a) so as to remove iron and/or iron oxides which may be present.

It will be appreciated that one or more of the treatment steps described above may be repeated one or more times in order to achieve the required separation.

The recovery of the wanted by-products from the solutions of the particularly preferred processes (i) and (ii) will now be described by way of example only.

First solution containing water-soluble inorganic matter from step (b)

The solution resulting after the initial water wash contains sodium fluoride, sodium carbonate and cyanide. Cyanide is present as both free cyanide and complexed cyanide and must be removed prior to the recovery of wanted products from the solution. The free cyanide can be destroyed, in situ, by the addition of a suitable oxidising agent, such as, for example, hydrogen peroxide or sodium hypochlorite.

The complexed cyanide is present as the soluble ferrocyanide anion and unlike free cyanide, it is resistant to oxidation in solution. However, after neutralisation of the solution with a mineral acid, the complexed cyanide can be selectively precipitated from the solution by the addition, to the solution, of a salt containing a suitable countercation, such as, for example, $Fe^{3+}$ or $Zn^{2+}$.

Preferably, zinc sulphate is added to the aqueous solution to give a precipitate of zinc ferrocyanide, $Zn_2Fe(CN)_6$, which is then separated from the solution by any suitable technique, such as, for example, filtration.

The resulting solution, which has been neutralised with a mineral acid prior to cyanide precipitation, now contains mainly sodium fluoride. This solution can be further processed to recover calcium fluoride by precipitation on the addition of a suitable calcium salt. It is preferred that if the neutralising acid is HCl, then the calcium salt is calcium chloride. Alternatively, if the neutralising acid is $H_2SO_4$, then the calcium salt is either calcium sulphate or calcium sulphate dihydrate.

Preferably, sulphuric acid is used with calcium sulphate dihydrate as this gives a precipitate of calcium fluoride and a solution of sodium sulphate. The calcium fluoride can be separated from the solution and used as a raw material for HF production and the aqueous sodium sulphate is a saleable commodity.

Second solution containing inorganic matter step (d) of process (i)

The solution resulting from the HF wash of SPL contains inorganic matter which is in a suitable form for further processing to isolate useful products. This solution contains an abundance of aluminium ions and minor amounts of dissolved iron, sodium, calcium and titanium. Aluminium can be isolated from this solution in a form amenable to conversation to smelter grade aluminium fluoride. For example, the dissolved aluminium compounds may be separated from the other compounds in the solution by any suitable known technique, such as, for example, preferential precipitation as an insoluble fluoride and then subsequently converted into a substantially pure form of aluminium fluoride which can be recovered for use in an aluminium smelting process.

It is preferred to precipitate the aluminium from the solution as an insoluble ammonium fluoroaluminate, for example, as ammonium tetrafluoroaluminate, $NH_4AlF_4$, or ammonium hexafluoroaluminate, $(NH_4)_3AlF_6$, or a mixture thereof. This can be achieved by the addition, to the solution, of a source of ammonium fluoride, such as, for example, ammonium fluoride, ammonium bifluoride ($NH_4HF_2$) or aqueous ammonia. The latter forms the ammonium fluoride in situ, by reaction with excess HF in solution.

After separation and drying, the recovered ammonium fluoroaluminates can be decomposed at 550° C., using known technology to produce aluminium fluoride and ammonium fluoride. It is also known that addition of alumina to the ammonium fluoroaluminates prior to decomposition results in the conversion of all fluoride values to aluminium fluoride with the concomitant formation of ammonia.

In practice, the recovery of pure ammonium fluoroaluminates, from the HF wash solution, is hindered by the co-precipitation, from the solution, of iron in the form of ammonium hexafluoroferrate, $(NH_4)_3FeF_6$. This leads to iron contamination of the aluminium fluoride formed in the subsequent decomposition step.

It has been found that reduction of the iron (III) in the solution to iron (II), using a suitable reducing agent such as, for example, metallic aluminium, iron or zinc, prior to the precipitation step, leads to the recovery of relatively pure ammonium fluoroaluminates, which can then be converted to smelter grade aluminium fluoride.

Preferably, the reducing agent is metallic aluminium, which is in itself compatible with the system, being oxidised to $Al^{3+}$ in the process. Aluminium metal will reduce Fe(III) to Fe(II) readily, however, if complete removal of the iron from the solution is desired, it can be reduced to metallic iron by metallic aluminium, under the appropriate pH and pF conditions and separated from the solution.

In an alternative embodiment, which does not require reduction of Fe(III) to Fe(II), urea can be added to the solution, with heating, to slowly precipitate substantially iron free ammonium tetrafluoroaluminate. The thermal decomposition of urea in aqueous solution, to produce ammonia, water and carbon dioxide is a known reaction. In the presence of aqueous HF, ammonium fluoride is formed in situ from this process.

Use is made of the fact that unlike aluminium, which forms insoluble $NH_4AlF_4$, iron does not form an insoluble $NH_4FeF_4$ salt, so that, by introducing ammonium fluoride slowly into the solution on a molecular level, preferential precipitation of ammonium tetrafluoroaluminate and therefore separation of aluminium from iron, can be achieved. When ammonium fluoride is produced in solution via urea decomposition, it is not present in the solution in a large enough concentration, due to its removal from the solution by preferential precipitation of $NH_4AlF_4$, to combine with the iron to form the insoluble $(NH_4)_3FeF_6$ salt.

Homogeneous precipitation from solution, using the urea method, yields denser precipitates than when conventional precipitation techniques are employed, such as, for example, the direct addition of ammonium fluoride to the solution. A denser and therefore more crystalline, $NH_4AlF_4$ salt produces a better quality $AlF_3$ on decomposition.

Solution containing inorganic matter from step (f) of process (i) or step (d) of process (ii)

The solution separated from the fluorosilicic acid wash of SPL contains an abundance of dissolved aluminium ions as a result of the extraction of cryolite and other reactive aluminium compounds into the solution. The aluminium compounds may be isolated from this solution in a form amenable for conversion to smelter grade aluminium fluoride as described above.

In an alternative step, using known technology, the excess fluorosilicic acid in the solution can be neutralised with aluminium hydroxide, $Al(OH)_3$ and the aluminium values precipitated from the solution as hydrated aluminium fluoride.

Third solution containing further inorganic matter from step (f) of process (i) after treatment with $H_2SO_4$ in step (e)

The water wash solution generated after $H_2SO_4$ treatment of SPL is acidic and contains the water soluble sulphates of aluminium and sodium as well as the acid soluble sulphates of calcium and magnesium, present in solution as $Ca(HSO_4)_2$ and $Mg(HSO_4)_2$ respectively. Neutralisation of this solution with ammonia results in the precipitation and subsequent separation of $CaSO_4$ and $MgSO_4$ from the solution.

Using existing technology applicable to aluminium hydroxide production, this solution which now primarily contains the sulphates of aluminium and of sodium can be basified with ammonia to precipitate the aluminium values as aluminium hydroxide, $Al(OH)_3$. The aluminium hydroxide is a raw material for either aluminium metal or aluminium fluoride production.

Fourth solution containing still further inorganic matter from step (h) of process (i) after treatment with $H_2SiF_6$ in step (e)

Treatment of SPL with $H_2SiF_6$ produces the sparingly soluble salt sodium hexafluorosilicate which remains with the solid carbonaceous residue. A hot water wash of this residue extracts essentially pure sodium hexafluorosilicate into solution which can be recovered by crystallisation upon cooling. Sodium hexafluorosilicate is a marketable chemical and is used in water fluoridation.

The invention will now be described with reference to the following Examples. These Examples are not to be construed as limiting the invention in any way.

EXAMPLE 1

The SPL Sample and Pretreatment before Digestion

A 50 kg batch of raw SPL was obtained from Tomago Aluminium Company. The SPL, which consisted of a mixture of carbon lining and refractory brick, was removed from the pot using a wet de-lining technique and the material was crushed in a conventional manner to a particulate size of less than 1 mm in diameter. Analysis of the SPL by ICP Atomic Emission Spectroscopy gave the following elemental concentrations as shown in Table 3 below.

TABLE 3

Composition of Raw SPL

| Sample | Elements % W/W | | | | | | | |
|---|---|---|---|---|---|---|---|---|
| | Na | Al | Ca | Si | Fe | K | Mg | Ti |
| 1 | 14.9 | 10.3 | 2.80 | 5.80 | 0.77 | 0.40 | 0.12 | 0.13 |
| 2 | 16.2 | 11.0 | 3.10 | 6.70 | 0.70 | 0.40 | 0.12 | 0.15 |
| 3 | 16.7 | 12.0 | 2.51 | 6.20 | 0.88 | 0.23 | 0.13 | 0.14 |
| Average | 15.9 | 11.1 | 2.80 | 6.23 | 0.78 | 0.34 | 0.12 | 0.14 |

The analyses show that SPL is not a homogenous material and elemental concentrations can vary significantly within the same batch.

The magnetic pretreatment of the SPL, to remove iron, is optional and was not performed on the sample.

The Digestion Steps

EXAMPLE 2

Initial Water Wash of SPL 1000 g of SPL was agitated in 7 liters of water, at room temperature, for a period of 3 hours. The solid carbonaceous residue was separated from the liquid phase by filtration, dried in air at 40° C. and weighed. The solid had a mass of 807 g which corresponds to extraction of approximately 20% of material from the raw SPL. The liquid phase, containing dissolved solid, had a total volume of 7.38 liters.

Evaporation of a portion of the liquid phase produced a solid crystalline residue which had an adjusted weight of 176 g, based on the entire volume of solution, after drying at 110° C. to remove free moisture. This crystalline material had the following elemental composition with concentrations shown in parentheses and expressed in weight percent: Na (54); Si (0.73); Fe (0.37) and K (0.13). XRD analysis showed an approximate ratio of 3:1/NaF:$NaCO_3$.

EXAMPLE 3

Treatment of the Water Wash Residue with Aqueous HF

The entire quantity of carbonaceous residue, isolated after the water wash described in Example 2, was treated with 5 liters of 10% w/w aqueous HF. The mixture was agitated for a period of three hours, during which time an exothermic reaction ensued raising the temperature of the mixture to 45° C. and then the solid was separated from the liquid phase by filtration. Following drying in air, the recovered carbonaceous material weighed 670 g, indicating a further 17% extractions of material from the SPL.

Evaporation of the filtrate from the HF wash produced a crystalline solid which weighed 100 g after drying in air at 110° C. This solid contained the following metallic elements as major constituents with concentrations shown in parentheses and expressed in weight percent: Al (20.7); Fe (6.60); Ti (1.20); Si (1.06); Na (0.62); Ca (0.25) and K (0.12). An XRD analysis of this residue confirmed the presence of hydrated aluminium fluoride, ferric fluoride and a small amount of sodium fluorosilicate.

EXAMPLE 4

Treatment of the Aqueous HF Residue with $H_2SiF_6$

The carbonaceous residue, recovered from the aqueous HF wash outlined in Example 3, was treated with 5 liters of a 10% w/w solution of fluorosilicic acid. After stirring for 3 hours, the remaining solid residue was separated from the liquid phase by filtration and dried in air to yield 586 g of material, representing a further extraction of 13% of solid from the SPL.

Evaporation of the fluorosilicic acid liquid phase produced a crystalline residue which, after drying at 110° C., weighed 190 g. The solid had the following elemental composition with concentrations shown in parentheses and expressed in weight percent: Al (14.0); Fe (0.61); Ti (0.04); Si (4.57); Na (3.8); Ca (5.4) and K (0.90). XRD analysis of the solid identified hydrated aluminium fluoride, calcium fluorosilicate and sodium fluorosilicate as the major components.

EXAMPLE 5

The Final Water Wash of the SPL Residue

The carbonaceous residue, recovered after the fluorosilicic acid treatment step described in Example 4, was washed with 3 liters of hot water (80° C.) for 90 minutes. The liquid phase was separated from the solid by hot filtration and the latter was thoroughly dried to yield 496 g of carbonaceous residue having the following metallic composition by weight: Al (12.8); Fe (0.12); si (2.63); Na (10.0); Ca (2.34) and K (0.22). XRD analysis of this material revealed the presence of graphite, corundum, sodium beta-aluminate and small amounts of both calcium fluoride and sodium fluorosilicate.

Corundum (alpha-alumina) and sodium beta-aluminate ($NaAl_{11}O_{17}$) are inert compounds which are constituents of the refractory brick which forms a part of SPL. Although not attempted, it should be possible to separate these compounds from the graphite by standard physical methods if desired.

XRD results confirmed that the final hot water wash extracted approximately 90 g of essentially pure sodium fluorosilicate from the SPL residue.

The results for the digestion experiments detailed in Examples 2 to 5 are represented in Table 4 below together with an elemental mass balance of all of the residues.

TABLE 4

Mass Balance of Filtrate Residues from the Digestion Steps

| Residues | Total Mass (g) | Elemental Mass (g) Al | Fe | Si | Na | Ca | K |
|---|---|---|---|---|---|---|---|
| Water | 176 | 0 | 0.7 | 1.3 | 95 | 0 | 0.23 |
| HF | 100 | 20.7 | 6.6 | 1.1 | 0.6 | 0.25 | 0.12 |
| FSA | 190 | 26.6 | 1.2 | 8.7 | 7.2 | 10.2 | 1.7 |
| Hot Water | 90 | 0 | 0 | 13.4 | 22 | 0 | 0 |
| Final Carbonaceous | 496 | 63.5 | 0.6 | 13.1 | 49.6 | 11.6 | 1.1 |
| Total | | 111 | 9.1 | 37.6 | 174 | 22 | 3.1 |
| Amount in 1000 g of Raw SPL | | 111 | 7.8 | 62.3 | 159 | 28 | 3.4 |

Overall, apart from silicon, the original quantity of elements present in raw SPL can be accounted for in the recovered residues. The values for silicon are low because this element exists as the fluorosilicate anion in the residues and as the analytical procedure involved an initial fusion step, a portion of the silicon was lost as volatile silicon tetrafluoride as a result of the decomposition of the fluorosilicate salts.

EXAMPLE 6

Sulphuric Acid Treatment of the Aqueous HF Residue

A 100 g portion of the carbonaceous residue, recovered from the aqueous HF wash outlined in Example 3, was treated with 100 ml of 98% $H_2SO_4$, at a temperature of 200° C., for a period of 3 hours. After reaction, the mixture was diluted with 600 ml of water and allowed to cool. The liquid phase was separated from the solid by filtration and the latter was further treated with 500 ml of water at 80° C. for a period of 90 minutes. Following filtration and thorough drying, the final carbonaceous residue weighed 48.7 g representing a 51.3% loss in weight. This value is equivalent to a recovery of 326 g, from an initial starting weight of 670 g, which is based on the entire amount of material recovered after HF treatment as described in Example 3.

The carbonaceous solid contained the following metallic elements with concentrations shown in parentheses and expressed in weight percent: Al (5.1); Fe (0.05); Si (1.7); Na (1.85); Ca (3.2) and K (0.25). The major compounds detected by XRD, in this residue, were graphite and the refractory solids corundum and sodium beta-aluminate.

The filtrate from the hot water wash of the carbonaceous residue, resulting after the $H_2SO_4$ treatment step, was evaporated to produce a crystalline residue which was analysed to contain a high aluminium content with smaller amounts of calcium and sodium. Although not attempted, this mixture should prove amenable towards the recovery of the aluminium values as aluminium hydroxide.

EXAMPLE 7

The Recovery of By-products from the Water Wash Liquid Phase

A portion of the liquid phase generated from the water wash of SPL, described in Example 2, was used in the following precipitation experiment.

Based on 7.38 liters of water wash solution, which had a pH of 12–12.5, the addition of 37 ml of concentrated HCl was required to reduce the pH of 6. To this neutral solution was added 400 ml of an aqueous solution containing 3.5% w/w zinc acetate. The mixture was stirred for 1 hour and the resulting white precipitate was collected by filtration and dried to give 6.12 g of $Zn_2Fe(CN)_6$. The total cyanide content of the original solution was reduced from 290 ppm to 21 ppm by the precipitation procedure; a reduction of over 90%. Although not attempted, the remaining soluble cyanide, most likely present as free cyanide, could have been destroyed by the addition of sodium hypochlorite to the solution.

After the precipitation and removal of zinc ferrocyanide, 550 g of $CaCl_2.2H_2O$ was added to the liquid phase. The mixture was stirred for 10 minutes prior to the addition of 400 ml of a 0.15% w/w solution of a flocculating agent, Superfloc N300. Following a further 1 hour of additional stirring, the solid was collected by filtration and dried at 110° C. to yield 122 g of material. Analysis of this sample showed it to contain 94% $CaF_2$ by weight with the major impurities being Na, Cl and Zn.

EXAMPLE 8

The Recovery of Aluminium Fluoride from the 10% w/w HF Wash Liquid Phase using Ammonium Fluoride A 100 ml sample of solution, obtained from a 5 liter batch of a 10% w/w HF wash of SPL, was treated with excess aluminium metal (1 g). The reduction of the Fe(III) to Fe(II), which was monitored using $NH_4SCN$ as indicator, required approximately 2 hours. Ammonium fluoride, 4 g, was then added to the solution to produce a white precipitate. After additional stirring for 1 hour, the solid was collected by filtration and dried at 60° C. The mass of precipitate, which consisted of a mixture of $NH_4AlF_4$ and $(NH_4)_3AlF_6$, was 3.5 g. This solid was decomposed at 550° C., under a stream of nitrogen, for 1 hour, to produce a sample of $AlF_3$ which was analysed to have the following composition by weight: Al (33.1); Fe (0.04); Na (0.42); Ca (0.01); K (<0.01) and Si (<0.01). These values are within the specifications required for smelter grade aluminium fluoride.

EXAMPLE 9

The recovery of Aluminium Fluoride from the 5.8% W/W HF Wash Liquid Phase using Urea A 100 ml sample of solution, obtained from a 5 liter batch of a 5.8% w/w aqueous HF wash of SPL, was used in this Example. To this was added an additional 5 ml of a 50% w/w aqueous solution of HF, so that enough HF would be available to complex with the ammonia, formed from the decomposition of urea, to produce ammonium fluoride. Urea, 2.4 g, was then added to the solution and the mixture was heated to a temperature of 90–94° C. for a period of four hours, with stirring. Precipitation of solid from the solution was evident after 30 minutes of heating and appeared to be complete within the experimental time frame. After cooling, the solid was collected by filtration, washed with water and dried in air to yield 2.3 g of material which consisted predominantly of $NH_4AlF_4$. Decomposition of this solid at 550° C. for 1 hour produced an aluminium fluoride product with an iron content of 0.1% by weight. Another experiment, performed using the same quantity of sample solution, but with the addition to the solution of 3 g of $NH_4F$ (equivalent to the $NH_4F$ produced from the decomposition of 2.4 g of urea), gave a precipitate which when pyrolysed at 550° C., produced an aluminium fluoride product with an iron content of greater than 0.4% by weight. This Example demonstrates that the precipitation of ammonium fluoroaluminates from aqueous solution, using urea, is effective in separating iron (III) from aluminium (III).

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

We claim:

1. A process for reducing and/or removing inorganic matter from spent potlining which comprises the steps of:

(i) (a) treating the spent potlining with water so as to form a first residue and a first solution containing water-soluble inorganic matter;

(b) separating the first residue from the first solution containing the water-soluble inorganic matter;

(c) treating the first residue with HF so as to form a second residue and a second solution containing inorganic matter;

(d) separating the second residue from the second solution containing the inorganic matter;

(e) treating the second residue with $H_2SiF_6$ or $H_2SO_4$ so as to form a third residue and a third solution containing further inorganic matter;

(f) separating the third residue from the third solution containing further inorganic matter;

(g) washing the third residue with water so as to form a fourth residue and a fourth solution containing still further inorganic matter; and (h) separating the fourth residue from the fourth solution containing still further inorganic matter; or (ii) (a) treating the spent potlining with water so as to form a first residue and a first solution containing water-soluble inorganic matter;

(b) separating the first residue from the first solution containing the water-soluble inorganic matter;

(c) treating the first residue with $H_2SiF_6$ or $H_2SO_4$ so as to form a second residue and a second solution containing inorganic matter;

(d) separating the second residue from the second solution containing the inorganic matter;

(e) treating the second residue with HF so as to form a third residue and a third solution containing further inorganic matter;

(f) separating the third residue from the third solution containing further inorganic matter;

(g) washing the third residue with water so as to form a fourth residue and a fourth solution containing still further inorganic matter; and (h) separating the fourth residue from the fourth solution containing still further inorganic matter.

2. A process according to claim 1 wherein the spent potlining is treated magnetically before step (a) so as to remove iron and/or iron oxide which may be present.

3. A process according to claim 1, wherein complex cyanide is recovered from the first solution as zinc ferrocyanide ($Zn_2Fe(CN)_6$).

4. A process according to claim 1, wherein fluoride contained in the first, second and/or third solutions is recovered as calcium fluoride.

5. A process according to claim 1, wherein a source of aluminium cations is added during step (c) of process (i) or step (e) of process (ii).

6. A process according to claim 5, wherein the source of aluminium cations is an aluminium salt or aluminium compound which is capable of producing aluminium cations on reaction with HF.

7. A process according to claim 6, wherein the aluminium salt is $Al(NO_3)_3$, $Al_2(SO_4)_3$ or $AlCl_3$.

8. A process according to claim 6, wherein the aluminium compound is a hydrated alumina.

9. A process according to claim 1, wherein a fluoride of aluminium is recovered from the second and/or third solutions.

10. A process according to claim 9, wherein a reducing agent is added to the second and/or third solutions so as to reduce Fe(III) to Fe(II) thereby reducing the iron contaminants in the recovered fluoride of aluminium.

11. A process according to claim 10, wherein the reducing agent is metallic aluminium, iron or zinc.

12. A process according to claim 9, wherein urea is added to the second and/or third solutions so as to form ammonium fluoride which results in the recovery of a substantially iron free ammonium tetrafluoroaluminate.

13. A process according to claim 12, wherein the ammonium tetrafluoroaluminate is used to produce smelter grade aluminium fluoride.

14. A process according to claim 9, wherein ammonium fluoride is added to the second and/or third solutions to form an ammonium fluoroaluminate.

15. A process according to claim 1, wherein one or more of steps (b), (d), (f) and (h) are followed by a water washing step of the residue.

16. A process according to claim 15, wherein heated water is used in the water washing step.

17. A process according to claim 1, wherein sodium fluorosilicate is recovered from the fourth solution.

18. A process according to claim 1 wherein the final residue is heated to remove any volatile unwanted products.

19. A process according to claim 1 wherein carbon and/or refractory aluminum compounds are separated from the fourth residue.

20. A process according to claim 19, wherein the refractory aluminium compounds are corundum and sodium beta-aluminate.

21. A process according to claim 1 wherein one or more of the treating steps are repeated one or more times in order to achieve the required separation.

22. A process for reducing and/or removing inorganic matter from spent potlining comprising:

(a) treating the spent potlining with water so as to form a first residue and a first solution containing water-soluble inorganic matter, including free cyanide, complexed cyanide, sodium fluoride and sodium carbonate;

(b) separating the first residue from the first solution containing the water soluble inorganic matter;

(c) treating said first solution with an oxidizing agent to destroy free cyanide;

(d) neutralizing the resulting solution with a mineral acid;

(e) treating said neutralized solution with a salt containing a counterion to precipitate complexed cyanide;

(f) separating the precipitated complexed cyanide from the treated neutralized solution to provide a substantially cyanide-free solution; and (g) treating the substantially cyanide-free solution with a calcium salt to precipitate the dissolved fluoride ions as calcium fluoride.

23. A process according to claim 22 wherein the calcium fluoride is separated from the substantially cyanide-free solution.

24. A process according to claim 22 wherein the oxidizing agent is hydrogen peroxide or sodium hypochlorite.

25. A process according to claim 22 wherein the mineral acid is HCl or $H_2SO_4$.

26. A process according to claim 22 wherein the salt containing a counterion is selected from salts of $Fe^{3+}$ or $Zn^{2+}$.

27. A process according to claim 22 wherein the calcium salt is selected from the group consisting of $CaCl_2$, $CaSO_4$, and calcium sulphate dihydrate.

* * * * *

UNITED STATES PATENT AND TRADEMARK OFFICE

CERTIFICATE OF CORRECTION

| | | |
|---|---|---|
| PATENT NO. | : | 5,939,035 |
| DATED | : | August 17, 1999 |
| INVENTOR(S) | : | John BESIDA |

It is certified that error(s) appears in the above-identified patent and that said Letters Patent is hereby corrected as shown below:

On the cover page, at Item No. [30], change "[SU]" to --AU--, and change "U.S.S.R." to --Australia--.

Signed and Sealed this

Thirteenth Day of June, 2000

Attest:

Q. TODD DICKINSON

*Attesting Officer*

*Director of Patents and Trademarks*